(12) United States Patent
Morimoto

(10) Patent No.: US 8,958,926 B2
(45) Date of Patent: Feb. 17, 2015

(54) DRIVE ASSISTING SYSTEM

(75) Inventor: Kazuhiro Morimoto, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/983,588

(22) PCT Filed: Sep. 30, 2011

(86) PCT No.: PCT/JP2011/072611
§ 371 (c)(1),
(2), (4) Date: Aug. 5, 2013

(87) PCT Pub. No.: WO2013/046449
PCT Pub. Date: Apr. 4, 2013

(65) Prior Publication Data
US 2014/0195069 A1    Jul. 10, 2014

(51) Int. Cl.
*G01C 21/26* (2006.01)
*G08G 1/0967* (2006.01)
*G09B 29/10* (2006.01)

(52) U.S. Cl.
CPC .......... *G01C 21/26* (2013.01); *G08G 1/096741* (2013.01); *G08G 1/096783* (2013.01); *G09B 29/106* (2013.01)
USPC ........................................ 701/1; 340/995.19

(58) Field of Classification Search
USPC ........................................ 701/1; 340/995.19
See application file for complete search history.

(56) References Cited

U.S. PATENT DOCUMENTS

| | | |
|---|---|---|
| 6,347,280 B1 | 2/2002 | Inoue et al. |
| 2005/0021205 A1 | 1/2005 | Niwa et al. |
| 2007/0100545 A1* | 5/2007 | Morita et al. ................. 701/211 |
| 2010/0004839 A1 | 1/2010 | Yokoyama et al. |

FOREIGN PATENT DOCUMENTS

| | | |
|---|---|---|
| CN | 101548301 | 9/2009 |
| JP | 2000-39330 | 2/2000 |
| JP | 2001-59731 | 3/2001 |
| JP | 2003-97953 | 4/2003 |
| JP | 2003-288694 | 10/2003 |
| JP | 2004-345571 | 12/2004 |
| JP | 2007-101388 | 4/2007 |
| JP | 2008-186416 | 8/2008 |
| JP | 2009-104333 | 5/2009 |
| JP | 2011-070358 | 7/2011 |

* cited by examiner

*Primary Examiner* — Mary Cheung
*Assistant Examiner* — Yuen Wong
(74) *Attorney, Agent, or Firm* — Finnegan, Henderson, Farabow, Garrett & Dunner, LLP

(57) ABSTRACT

A drive assisting device in an in-vehicle device calculates drive assisting information associated with an intersection required for drive assisting control to an assisting vehicle based on intersection information of the relevant intersection received from a road side instrument, and calculates the drive assisting information according to type of drive assisting information when performing the drive assisting control associated with the intersection based on the drive assisting information. The drive assisting device divides the drive assisting information for every type (static information and dynamic information at the intersection), and sequentially performs the calculation.

20 Claims, 5 Drawing Sheets

DRIVE ASSISTING SYSTEM

CROSS-REFERENCE TO RELATED APPLICATIONS

This application is a national phase application of International Application No. PCT/JP2011/072611, filed Sep. 30, 2011, the content of which is incorporated herein by reference.

FIELD

The present invention relates to a drive assisting system that assists driving at an intersection.

BACKGROUND

Conventionally, a technique of generating drive assisting information based on intersection information of an intersection before an assisting vehicle approaches the relevant intersection, and performing driving assistance on the assisting vehicle based on such drive assisting information is known. For example, Patent Literature 1 discloses a car navigation system in which an advancing direction at a second intersection is displayed with a guiding arrow short of a first intersection in successive intersections.

Patent Literature 2 discloses a technique where when a vehicle does not stop short of a traffic signal, first signal cycle information corresponding to such case is selected to perform traveling assistance of the vehicle, and when the vehicle stops short of the traffic signal, second signal cycle information corresponding to such case is selected to perform the traveling assistance of the vehicle. In this technique, signal cycle information including all information of the first signal cycle information and all information of the second signal cycle information is generated and transmitted to the vehicle if a display time band of the signal associated with the first signal cycle information and a display time band of the signal associated with the second signal cycle information do not overlap, and signal cycle information including all information of the first signal cycle information and information excluding the information associated with the overlapping display time band from the second signal cycle information is generated and transmitted to the vehicle if the respective display time bands overlap. Patent Literature 3 discloses a technique of adding priority to guiding information, map information, and the like, and changing the guiding information, the map information, and the like in accordance with the priority so that the total amount of information falls within a memory capacity when the total amount of information up to the next communicable region including a communication inappropriate region on a guiding path of the vehicle exceeds the memory capacity.

CITATION LIST

Patent Literature

Patent Literature 1: Japanese Patent Application Laid-open No. 2000-039330
Patent Literature 2: Japanese Patent Application Laid-open No. 2009-104333
Patent Literature 3: Japanese Patent Application Laid-open No. 2003-097953

SUMMARY

Technical Problem

When performing the driving assistance with respect to a plurality of successive intersections, the intersection information of the plurality of intersections may be obtained at the same time or with a slight time difference, and the intersection information of the plurality of successive intersections can be analyzed at the same timing by generating the drive assisting information associated with each intersection and the drive assisting information between the intersections at the same timing based on the intersection information of the respective intersections. Thus, in the conventional art, the load of the calculation processing associated with the driving assistance such as the analysis of the intersection information, that is, the generation of the drive assisting information, and the like increases the greater the intersection information of one intersection to be handled in the driving assistance, and the greater the number of intersections which intersection information can be obtained at the same time or with a slight time difference.

It is an object of the present invention to improve drawbacks of the conventional art example and to provide a drive assisting system capable of reducing the load of the calculation processing associated with the driving assistance.

Solution to Problem

In order to achieve the above mentioned object, in a drive assisting system according to the present invention, the drive assisting system calculates drive assisting information associated with an intersection required for drive assisting control to an assisting vehicle based on intersection information of the intersection, and calculates the drive assisting information according to type of drive assisting information when performing the drive assisting control associated with the intersection based on the drive assisting information.

Here, it is desirable that the drive assisting information is divided for each type and sequentially calculated.

Further, it is desirable that the type of drive assisting information is static information and dynamic information at the intersection.

Further, it is desirable that the type of drive assisting information includes information required for execution of the drive assisting control regardless of type of assisting content of the drive assisting control, and information required for execution of the drive assisting control corresponding to the assisting content of the drive assisting control requested for execution.

Further, it is desirable that the type of drive assisting information corresponds to a distance between a position of the assisting vehicle and the intersection.

Further, it is desirable that the intersection is an immediate intersection in an advancing direction of a road on which the assisting vehicle is traveling.

Further, it is desirable that when performing the drive assisting control to a plurality of intersections including the immediate intersection, drive assisting information associated with a non-immediate intersection excluding the immediate intersection among the plurality of intersections has simple drive assisting information calculated based on intersection information of the non-immediate intersection with respect to the drive assisting information associated with the immediate intersection.

Further, it is desirable that the simple drive assisting information has an amount of information suppressed compared to the drive assisting information required for the drive assisting control associated with the non-immediate intersection, and information required for the drive assisting control associated with the non-immediate intersection is calculated at a stage before passing the immediate intersection.

Further, it is desirable that the simple drive assisting information has an amount of information suppressed compared to the drive assisting information required for the drive assisting control associated with the non-immediate intersection, and static information is calculated at the non-immediate intersection.

Further, it is desirable that the drive assisting control associated with the immediate intersection is executed based on the drive assisting information associated with the immediate intersection and the simple drive assisting information associated with the non-immediate intersection.

Further, it is desirable that when the assisting vehicle has passed the immediate intersection, the drive assisting control associated with the non-immediate intersection is executed based on the simple drive assisting information.

Further, it is desirable that when the assisting vehicle has passed the immediate intersection, a non-immediate intersection closest from the assisting vehicle in an exit way from the immediate intersection is assumed as a new immediate intersection.

Further, it is desirable that number of non-immediate intersections in which calculation processing of the simple drive assisting information is executed at same timing is changed according to a calculation processing ability of the assisting vehicle.

Advantageous Effects of Invention

The drive assisting information calculated based on the intersection information has various types. The drive assisting control executed based on such drive assisting information sometimes differ in the timing of execution according to the assisting content, for example. The intersection information and the drive assisting information include information that does not vary regardless of the change in the distance between the assisting vehicle and the intersection, the elapse of time, and the like such as the shape of the intersection, and the like, and information that varies momentarily such as the existence and position of other vehicles, and the like. The drive assisting system according to the present invention calculates the drive assisting information according to the type of drive assisting information to reduce the load of the calculation processing. Therefore, according to the drive assisting system, the load of the calculation processing is reduced, and the drive assisting control is inexpensively achieved without using the arithmetic processing unit having high processing ability but is of high cost.

DESCRIPTION OF EMBODIMENTS

An embodiment of a drive assisting system according to the present invention will be hereinafter described in detail based on the drawings. The present invention is not limited by the embodiment.

Embodiment

An embodiment of a drive assisting system according to the present invention will be described based on FIG. 1 to FIG. 5.

Figure 1:
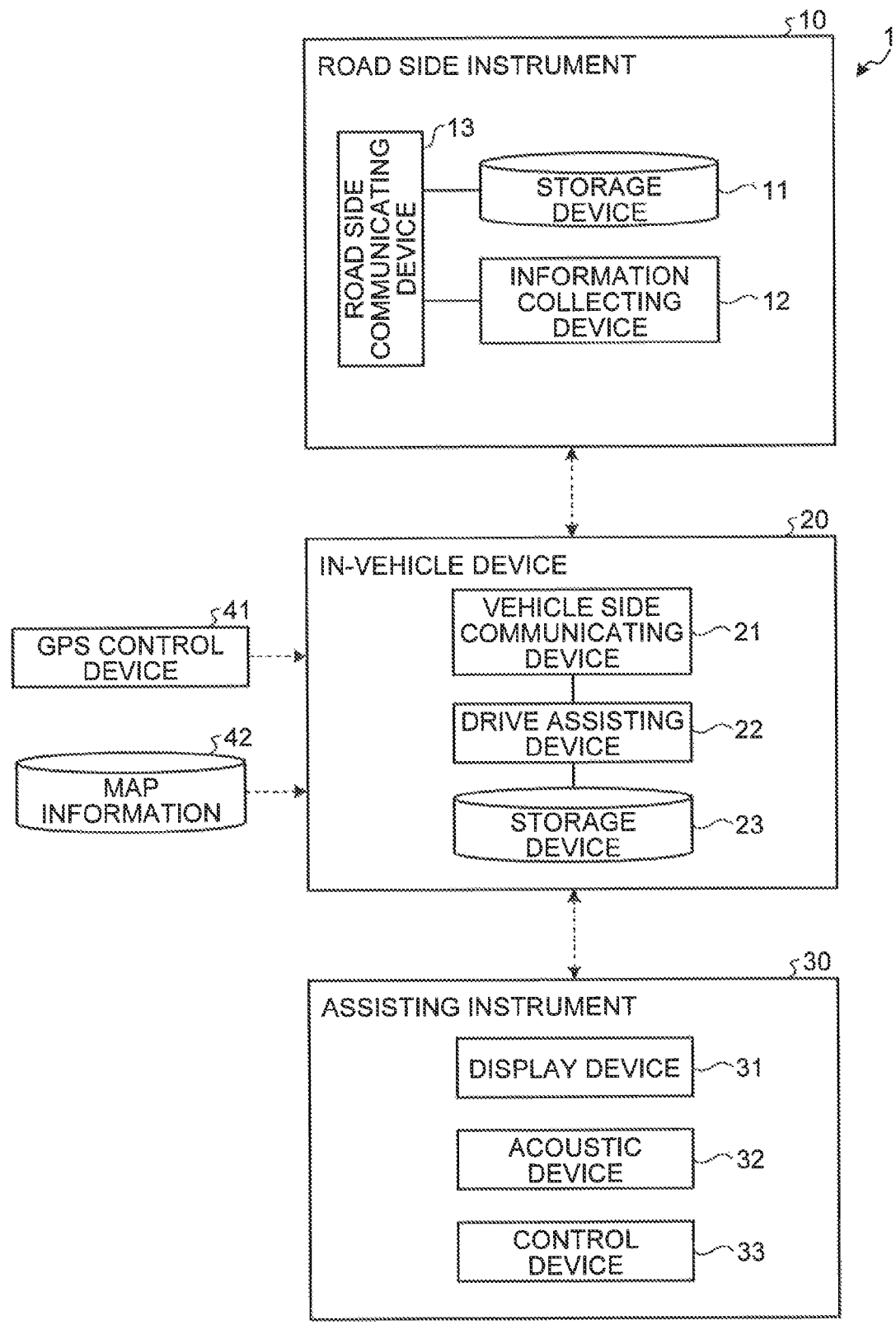
FIG. 1 is a block diagram illustrating a configuration of an embodiment of a drive assisting system according to the present invention.

Reference sign 1 of FIG. 1 indicates a drive assisting system of the present embodiment. The drive assisting system 1 performs driving assistance with respect to an assisting vehicle headed toward an intersection based on the information of the relevant intersection (hereinafter also referred to as "intersection information").

The driving assistance includes, for example, transmission of drive assisting information with respect to a driver of the assisting vehicle, travel control (vehicle speed control, etc.) of the assisting vehicle based on the drive assisting information, and the like. The drive assisting information is generated in accordance with the assisting content of the driving assistance on the basis of the intersection information, and includes, for example, behavior information (waiting for right turn, etc.) of the opposing vehicle at the intersection and the periphery thereof, existence information of the approaching vehicle from other connecting roads of the intersection, and the like. The drive assisting system 1 can be applied to a Green Wave Drive Assisting System, for example. The Green Wave Drive Assisting System is a drive assisting system that controls the vehicle speed so that the vehicle can pass when the light of each intersection on the guiding path of the car navigation system is lighted to green, thus achieving smoothness of traffic, for example. In this case, the drive assisting information (vehicle speed etc.) is generated so that the vehicle can pass when the light of the respective intersection is lighted to green based on the intersection information of each intersection on the guiding path, and the drive assisting information is transmitted with display information, and the like to the driver of the assisting vehicle, and the vehicle speed control of the assisting vehicle is carried out based on the drive assisting information. The drive assisting information is generated by calculation processing, but may include the intersection information itself such as the signal pattern information, to be described later, and the like.

There is various intersection information. For example, the intersection information includes road linear information of each connecting road connecting to the intersection, signal information of the traffic signal installed at the intersection, other vehicle information and pedestrian information detected at the intersection and the periphery thereof, traffic information at the intersection and the periphery thereof, and the like.

The road linear information is the linear information of each connecting road having the relevant intersection as the center, and includes angle information of the respective connecting road with respect to a certain reference line of the intersection, stop line position information of each connecting road, lane information in the respective connecting road, and the like. The signal information includes transition information (signal pattern information) of one period associated with the signal pattern. For example, in a case of a lighting instrument of a plurality of light colors, the transition in one period of the advance-enabling light color and the advance-disabling light color (transition of display of green→yellow→red in the case of three color lighting instrument) becomes the signal pattern information. The other vehicle information detected at the intersection and the periphery thereof is obtained by detecting the state of other vehicles traveling at the intersection or on the connecting road at the periphery thereof or being parked to wait for the traffic signal at the intersection or on the connecting road, for example. The pedestrian information detected at the intersection or the periphery thereof is, for example, obtained by detecting pedestrians and bicycles crossing the pedestrian crossing or waiting for the traffic signal. The traffic information at the intersection and the periphery thereof includes, for example, traffic jam information, traffic control information, and the like.

In the drive assisting system 1, the drive assisting information is generated using the intersection information corresponding to the relevant assisting content from the various types of intersection information, and the driving assistance is carried out with such assisting content.

A configuration of a specific example of the drive assisting system 1 will be described with a flowchart.

The drive assisting system 1 includes a road side instrument 10 installed at the intersection or at the vicinity thereof, and an in-vehicle device 20 mounted on the assisting vehicle. In the illustrated drive assisting system 1, the in-vehicle device 20 that receives the intersection information from the road side instrument 10 executes the analysis of the relevant intersection information, that is, the generation of the drive assisting information of the own vehicle based on the intersection information, and executes the driving assistance based on the drive assisting information. The drive assisting system 1 may be configured so that the road side instrument 10 executes the generation of the drive assisting information.

The road side instrument 10 transmits at least the intersection information described above to the assisting vehicle. The road side instrument 10 includes a storage device 11. The storage device 11 stores information that can be stored as a database in advance among the intersection information described above. For example, the storage device 11 stores the road linear information, the signal information, and the like. The road side instrument 10 also includes an information collecting device 12 such as an imaging device, a radar device, and the like. The information collecting device 12 collects information on the road and the sidewalk at the intersection as well as the periphery thereof among the intersection information described above, and for example, detects the other vehicle information and the pedestrian information detected at the intersection and the periphery thereof.

The road side instrument 10 transmits the intersection information toward the assisting vehicle with a road side communicating device 13. The road side communicating device 13 is a road-vehicle communicating device for transmitting and receiving (so-called road-vehicle communication) data wirelessly with a vehicle side communicating device 21 of the assisting vehicle. The illustrated road side communicating device 13 merely needs to be able to transmit at least the information of the road side instrument 10 toward the assisting vehicle.

The in-vehicle device 20 receives the information of the road side instrument 10 from the road side communicating device 13 through the vehicle side communicating device 21. The in-vehicle device 20 performs the driving assistance of the own vehicle based on the information of the road side instrument 10. The vehicle side communicating device 21 is a road-vehicle communicating device that performs the road-vehicle communication wirelessly with the road side communicating device 13.

The in-vehicle device 20 includes a drive assisting device 22 for calculating the drive assisting information associated with the intersection of the own vehicle, and executing the driving assistance based on the drive assisting information. The drive assisting device 22 calculates the drive assisting information based on the intersection information received from the road side instrument 10, and controls an assisting instrument 30 based on the drive assisting information. The assisting instrument 30 includes a display device 31 for displaying the drive assisting information in the vehicle compartment to notify the driver, an acoustic device 32 for indicating the drive assisting information with acoustic information such as alarm, and the like to notify the driver, and the like. The assisting instrument 30 may be a control device 33 such as a control actuator of a throttle valve of an engine (not illustrated), an actuator for braking force control of the brake device, and the like. That is, the drive assisting device 22 may perform the driving assistance by appealing the generated drive assisting information to the eye and the ear of the driver, or may perform the driving assistance by controlling the traveling state of the vehicle based on the drive assisting information.

The drive assisting information can be broadly divided in the following manner.

For example, the drive assisting information can be divided to information required for the execution of the drive assisting control regardless of the type of assisting content of the drive assisting control at the intersection (hereinafter referred to as "essential drive assisting information") and information required for the execution of the drive assisting control corresponding to the assisting content of the drive assisting control requested for execution (hereinafter referred to as "unique drive assisting information"). The essential drive assisting information is, in other words, information required for the execution of the drive assisting control associated with the intersections of all assisting contents in the present system regardless of whether or not the drive assisting control is requested for execution. The unique drive assisting information is, in other words, information that is not necessarily required for the execution of the drive assisting control of all assisting contents in the present system but is required for the execution of the drive assisting control by the assisting content requested for execution.

When causing the drive assisting device 22 to execute the drive assisting control, the calculation processing of the essential drive assisting information is always executed regardless of the assisting content of the driving assistance being requested. The unique drive assisting information may be used alone for the drive assisting control or may be used with the essential drive assisting information for the drive assisting control. Thus, the drive assisting device 22 is caused to first execute the calculation processing of the essential drive assisting information, and after such calculation processing is finished, to execute the calculation processing of the unique drive assisting information corresponding to the assisting content of the driving assistance requested for execution. The calculation result is temporarily stored in a storage device 23 until no longer needed. When reaching the execution timing of the driving assistance, the drive assisting device 22 executes the driving assistance based on the essential drive assisting information and the unique drive assisting information, which are the calculation results. The drive assisting device 22 thus can prevent the concentration of the load of the calculation processing since the simultaneous progression of the calculation processing of the essential drive assisting information and the calculation processing of the unique drive assisting information can be avoided.

The drive assisting information can also be broadly divided in the following manner according to the short and long of the distance between the position of the assisting vehicle and the intersection.

For example, the drive assisting information can be divided to information required for the execution of the drive assisting control from before the assisting vehicle approaches the intersection, and information required for the execution of the drive assisting control from after the assisting vehicle further approaches the intersection. The former information is, for example, the drive assisting information required for the execution of the drive assisting control from the stage of being away from the intersection immediately after receiving the intersection information, and corresponds to the drive assisting information (information associated with the road shape such as the angle of the other connecting road with respect to the approach way to the intersection of the assisting vehicle, etc.) to be transmitted to the driver of the assisting vehicle. The latter information is the drive assisting information that cannot be confirmed until the assisting vehicle approaches the intersection, for example, and corresponds to dynamic drive assisting information calculated based on the intersection information (other vehicle information, pedestrian information, etc. detected at the intersection and the periphery thereof) that changes with elapse of time.

In this case, the drive assisting device 22 is caused to first execute the calculation processing of the drive assisting information required at the stage of being away from the intersection, and after the calculation processing is finished, to execute the calculation processing of the drive assisting information required after further approaching the intersection compared to the former drive assisting information. The calculation result is temporarily stored in the storage device 23 until no longer needed. Therefore, the drive assisting device 22 can prevent the concentration of the load of the calculation processing since the simultaneous progression of the calculation processing of the calculation processing of different types of drive assisting information corresponding to the short and long of the distance between the position of the assisting vehicle and the intersection can be avoided. The drive assisting device 22 performs the calculation processing of the drive assisting information, which has the possibility of changing, later, and thus the more recent drive assisting information can be obtained, which also leads to reduction in the load of the calculation processing.

The drive assisting information can also be broadly divided to the drive assisting information that is not updated after once calculated until the assisting vehicle passes the intersection, and the drive assisting information that has the possibility of being updated before the assisting vehicle passes the intersection.

The drive assisting information that is not updated after the calculation processing is, for example, the information associated with the road shape such as the angle of the other connecting road with respect to the approach way to the intersection of the assisting vehicle, and the information of the distance from the assisting vehicle to a certain position (e.g., stop line position of the intersection), and corresponds to static drive assisting information calculated based on the road linear information, and the like described above. The drive assisting information that has the possibility of being updated before passing the intersection corresponds to the dynamic drive assisting information described above, for example.

In this case, the drive assisting device 22 is caused to first execute the calculation processing of the drive assisting information that is not updated after the calculation processing, and after the calculation processing is finished, to execute the calculation processing of the drive assisting information that has the possibility of being updated after the calculation processing. The calculation result is temporarily stored in the storage device 23 until no longer needed. Therefore, the drive assisting device 22 can prevent the concentration of the load of the calculation processing since the simultaneous progression of the calculation processing of different types of drive assisting information can be avoided. The drive assisting device 22 performs the calculation processing of the drive assisting information, which has the possibility of changing, later, and thus the more recent drive assisting information can be obtained, which also leads to reduction in the load of the calculation processing.

Therefore, in the drive assisting system 1, the timing to perform the calculation processing is shifted according to the type of drive assisting information, and the calculation processing of the drive assisting information is sequentially executed for every type. Therefore, according to the drive assisting system 1, the load of the calculation processing can be reduced, so that the execution of the drive assisting control can be carried out without using the arithmetic processing unit such as a CPU, which has a high processing ability but is of high cost, and the drive assisting control can be inexpensively achieved.

The description made above is associated with the driving assistance associated with the immediate intersection in the advancing direction of the assisting vehicle, but the calculation processing sequentially performed according to the type of drive assisting information can also be applied to the service (e.g., Green Wave Drive Assisting System) of the driving assistance associated with a plurality of successive intersections.

The assisting vehicle can sometimes receive the intersection information from the road side instrument 10 of a plurality of intersections ahead of the immediate intersection connected to the immediate intersection at the same time as or with a slight time difference with the intersection information received from the road side instrument 10 of the immediate intersection in the advancing direction. In this case, the drive assisting information associated with each intersection can be calculated in simultaneous progression. However, the arithmetic processing unit of high processing ability is required to perform such calculation processing of simultaneous progression, which may lead to increase in cost. Therefore, in the drive assisting system 1, the increase in the cost for the arithmetic processing unit is desirably suppressed by reducing the load applied to the calculation processing of the drive assisting information associated with each intersection.

In the drive assisting system 1, if the intersection information of a plurality of successive intersections is received, the calculation processing of the drive assisting information based on the intersection information of the immediate intersection is sequentially executed according to the type of drive assisting information as described above, and after the calculation processing is finished, the calculation of the drive assisting information associated with the intersection (hereinafter referred to as "successive intersection") ahead of the immediate intersection, which intersection information is received, is performed. Thus, according to the drive assisting system 1, the load of the calculation processing can be reduced by sequentially performing the calculation processing of the drive assisting information associated with a plurality of intersections for every intersection, and hence the drive assisting control associated with a plurality of successive intersections can be executed without using the arithmetic processing unit having high processing ability but is of high cost, for example, and the drive assisting control can be inexpensively achieved.

The successive intersection is each successive intersection with respect to the immediate intersection on the guiding path when the guiding path is set. In this case, if the intersection information of a plurality of successive intersections on the guiding path is received, the drive assisting information based on the intersection information is calculated in order from the intersection which distance with the assisting vehicle is the closest. Furthermore, in this case, the intersection information of the intersection other than the respective intersections on the guiding path is sometimes received. The drive assisting information associated with the intersection other than the respective intersections on the guiding path does not need to be calculated, but the drive assisting information associated with the intersection other than the respective intersections on the guiding path may be calculated since there is a possibility of going off the guiding path by the judgment of the driver. The drive assisting information associated with the intersection deviated from the advancing direction of the assisting vehicle is desirably erased after the advancing direction of the assisting vehicle is confirmed.

The successive intersection corresponds to each intersection on a following road in the service region when providing the Green Wave Drive Assisting service. In this case, if the intersection information of a plurality of successive intersections on the following road is received, the drive assisting information based on the intersection information is calculated in order from the intersection which distance with the assisting vehicle is the closest. Furthermore, in this case, the intersection information of the intersection other than the respective intersections on the following road is sometimes received. The drive assisting information associated with the intersection other than the respective intersections on the following road does not need to be calculated, but the drive assisting information associated with the intersection other than the respective intersections on the following road may be calculated since there is a possibility of going off the following road by the judgment of the driver. The drive assisting information associated with the intersection deviated from the advancing direction of the assisting vehicle is desirably erased after the advancing direction of the assisting vehicle is confirmed.

The successive intersection corresponds to the successive intersection on each connecting road leading to the immediate intersection if the drive assisting service such as a route guidance, Green Wave Drive Assisting, and the like is not being provided with respect to a plurality of intersections. In this case, to which connecting road (i.e., exit way candidate) the assisting vehicle will advance from the immediate intersection is not known, and thus the drive assisting information associated with the successive intersections in each exit way candidate is preferably calculated. The drive assisting information associated with the intersection deviated from the advancing direction of the assisting vehicle is desirably erased after the advancing direction of the assisting vehicle is confirmed.

The calculation processing of the drive assisting information associated with the successive intersections may be sequentially executed according to the type of drive assisting information, similar to the immediate intersection. In particular, if the start timing of the calculation processing with respect to the successive intersection is not reached before the assisting vehicle approaches the immediate intersection due to reasons such as long distance between the immediate intersection and the successive intersection one ahead, the calculation processing of the drive assisting information according to type is desirably carried out after the calculation processing of the drive assisting information associated with the immediate intersection. This is because after the own vehicle has passed the immediate intersection, the successive intersection one ahead of the immediate intersection on the traveling path of the own vehicle becomes the new immediate intersection.

If the service of driving assistance with respect to the successive intersections is being provided, the drive assisting control associated with the successive intersection on the immediate intersection is sometimes performed from before the assisting vehicle passes the immediate intersection. Thus, the calculation of the drive assisting information associated with the successive intersection is desirably carried out before the assisting vehicle passes the immediate intersection.

However, some drive assisting information associated with the immediate intersection is dynamic, which means that re-calculation is required along with the updating of the intersection. In this case, therefore, there is a possibility the re-calculation processing of the dynamic drive assisting information associated with the immediate intersection and the calculation processing of the drive assisting information associated with the successive intersection are executed at the same timing. Thus, when performing the calculation of the drive assisting information associated with the successive intersection before the assisting vehicle passes the immediate intersection, only the drive assisting information that can reduce the load of the calculation processing is calculated based on the intersection information of the successive intersection. For example, for the drive assisting information associated with the successive intersection, only the drive assisting information (hereinafter referred to as "simple drive assisting information") in which the amount of information is suppressed compared to all the detailed drive assisting information necessary for the drive assisting control associated with the successive intersection thereof is calculated. Thus, even if the calculation processing of the simple drive assisting information and the re-calculation processing of the dynamic drive assisting information associated with the immediate intersection are executed at the same timing, the increase in the load of the calculation processing can be suppressed in such a case.

The drive assisting information necessary for the drive assisting control associated with the successive intersection at the stage of before passing the immediate intersection, for example, can be set for the simple drive assisting information. For example, the information of the distance from the assisting vehicle to the successive intersection, the stop line position information in the approach way of the successive intersection, the terminating point position information of the successive intersection, the signal pattern information described above at the successive intersection, and the like may be adopted. Therefore, the static essential drive assisting information to be described later may be applied for the simple drive assisting information. That is, the simple drive assisting information includes that in which the amount of information is suppressed compared to the drive assisting information (static drive assisting information and dynamic drive assisting information) necessary for the drive assisting control associated with the successive intersection, and the static information at the successive intersection may be applied. The terminating point position information corresponds to the position information of the entrance of the exit way if the exit way from the successive intersection is specified such as the guiding path is set, and the position information of the entrance of all exit way candidates at the successive intersections if the exit way from the successive intersection is not specified.

In such drive assisting system 1, the calculation processing of the simple drive assisting information associated with the successive intersection may be performed during the calculation processing (exclude re-calculation processing of the dynamic drive assisting information) of all the detailed drive assisting information associated with the immediate intersection, although it depends on the processing ability of the arithmetic processing unit. In this case, the simple drive assisting information associated with the successive intersection can be obtained at an earlier stage than when executing the calculation processing of the simple drive assisting information after the calculation processing of all the detailed drive assisting information associated with the immediate intersection is finished, and thus the responsiveness of the drive assisting control associated with the successive intersection can be enhanced while suppressing the increase in the load of the calculation processing. Therefore, the processing ability of the arithmetic processing unit is desirably set to be able to execute at least the calculation processing of the drive assisting information of one type associated with the immediate intersection and the calculation processing of the simple drive assisting information associated with the successive intersection for one location at the same time without being high load.

Figure 2:
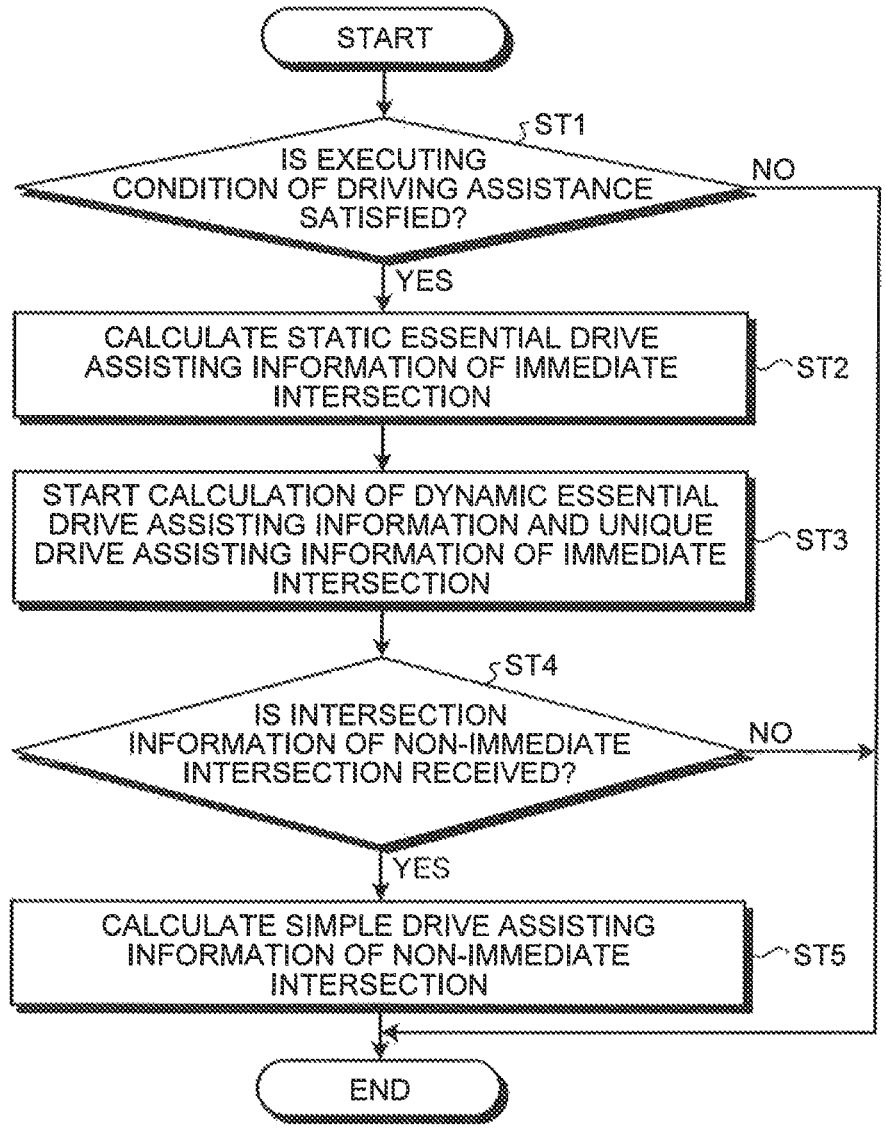
FIG. 2 is a flowchart explaining a calculation processing operation of an embodiment of the drive assisting system according to the present invention.

An example of a calculation processing of the drive assisting information in the drive assisting system 1 will be hereinafter described using the flowcharts of FIG. 2 and FIG. 3. Description is made on performing the single driving assistance (e.g., driving assistance associated with safety such as provision of other vehicle information waiting for right turn in the opposite lane, etc.) on the immediate intersection with respect to the assisting vehicle, and performing the driving assistance (e.g., Green Wave Drive Assisting) on the successive intersection including the immediate intersection and the successive intersection thereof.

The drive assisting device 22 determines whether or not the own vehicle corresponds to the executing condition of the driving assistance (step ST1). If the own vehicle is out of the service region of the driving assistance, or if the own vehicle is within the service region but out of the region the information of the road side instrument 10 of the intersection, which is the executing target of the driving assistance, can be received, the drive assisting device 22, for example, determines as not corresponding to the executing condition of the driving assistance. The drive assisting device 22 may repeat step ST1 until corresponding to the executing condition of the driving assistance. A case of not corresponding to the executing condition of the driving assistance corresponds to region A in FIG. 4, and a case of corresponding to the executing condition of the driving assistance corresponds to region B and thereafter in FIG. 4.

Figure 4:
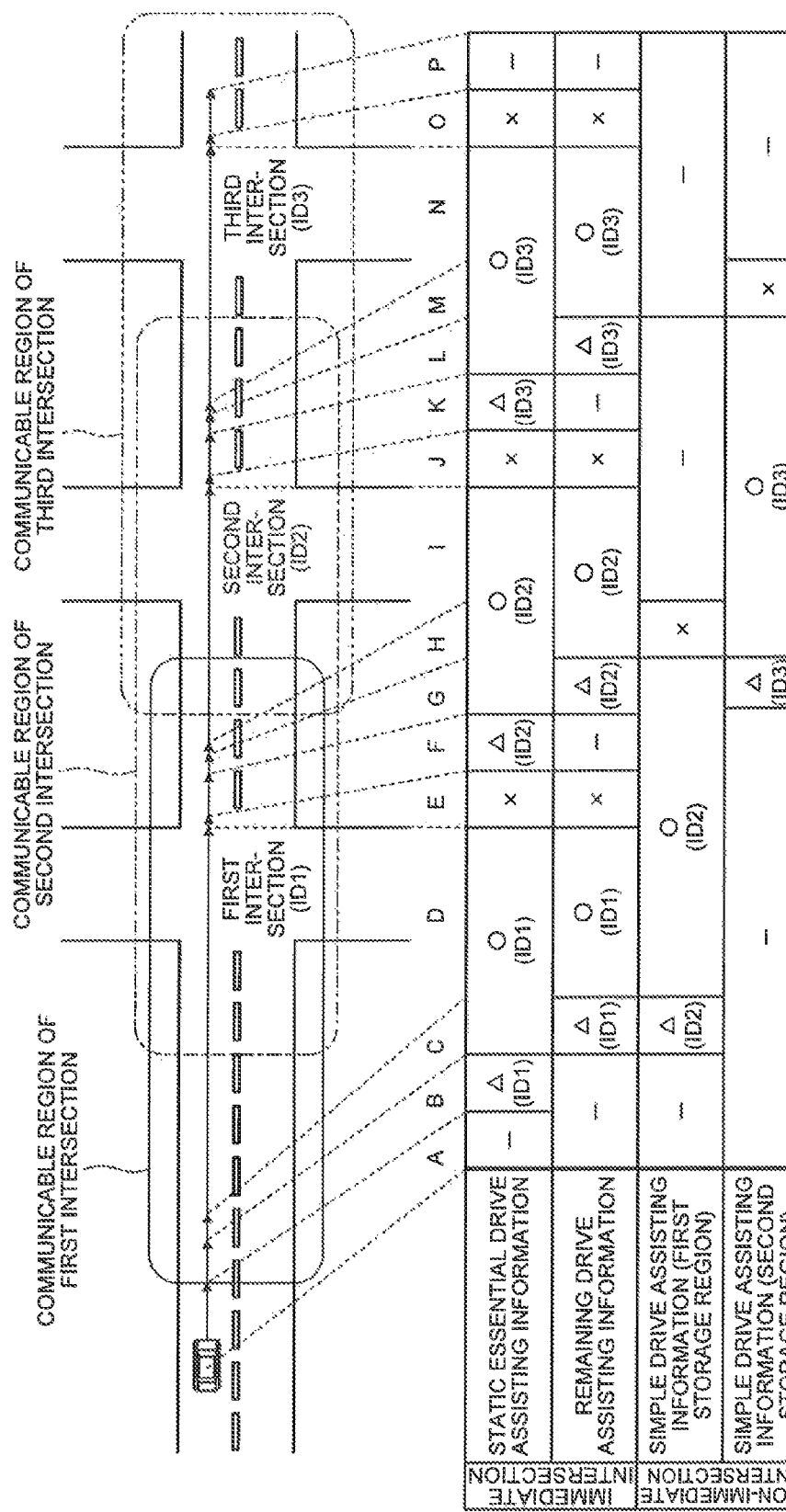
FIG. 4 is a view explaining the position with respect to the intersection of the assisting vehicle and the calculation timing of the drive assisting information.

If the own vehicle corresponds to the executing condition of the driving assistance, the drive assisting device 22 calculates the static essential drive assisting information associated with the immediate intersection (first intersection) as illustrated in region B in FIG. 4 (step ST2). The static essential drive assisting information is the information, among the essential drive assisting information, that is not updated after once calculated until the assisting vehicle passes the intersection, and that is required for the execution of the drive assisting control from before the assisting vehicle approaches the intersection. Thus, the drive assisting device 22 first calculates the static essential drive assisting information regardless of whether or not the assisting content of the driving assistance associated with the immediate intersection is clear.

The static essential drive assisting information completed with the calculation processing is stored in the storage device 23, and held until the assisting vehicle has completely passed the immediate intersection, as illustrated in regions C to D of FIG. 4. The drive assisting device 22 performs the drive assisting control associated with the immediate intersection based on such static essential drive assisting information.

The remaining essential drive assisting information excluding the static essential drive assisting information becomes the dynamic essential drive assisting information. The dynamic essential drive assisting information is changed when the intersection information of the immediate intersection is updated, and thus is excluded from the calculation processing of step ST2 and obtained later. Thus, the calculation processing having a possibility of not being determined at one time such as the dynamic essential drive assisting information is performed in the post-step, and hence the load of the calculation processing is also reduced from this standpoint.

After finishing the calculation processing of the static essential drive assisting information associated with the immediate intersection (step ST3), the drive assisting device 22 starts the calculation processing of the remaining drive assisting information associated with the immediate intersection (first intersection), as illustrated in region C in FIG. 4, and determines whether or not the intersection information of the successive intersection (second intersection) with respect to the immediate intersection is received (step ST4).

The remaining drive assisting information is the dynamic essential drive assisting information described above, and the unique drive assisting information described above. Thus, in step ST3, the assisting content of the driving assistance associated with the immediate intersection is checked, and the unique drive assisting information corresponding to the assisting content is calculated.

The intersection information of the successive intersection is broadly divided to that used in the drive assisting service with respect to the single intersection for the successive intersection, and that used in the drive assisting service with respect to a plurality of intersections for the successive intersection. In step ST4, determination is made that the intersection information of the successive intersection is received if at least one of the intersection information is received.

The drive assisting device 22 terminates the calculation processing if the intersection information of the successive intersection is not received.

If the intersection information of the successive intersection is received, the drive assisting device 22 performs the calculation processing of the simple drive assisting information described above associated with the successive intersection with respect to the immediate intersection, as illustrated in region C in FIG. 4, without waiting for the calculation processing of the remaining drive assisting information associated with the immediate intersection to finish (step ST5). In this case, for example, the calculation processing amount of the remaining drive assisting information may be small, and there is a possibility the calculation processing of the simple drive assisting information may start after the calculation processing of the drive assisting information is finished.

The remaining drive assisting information associated with the immediate intersection completed with the calculation processing is stored in the storage device 23, and held until the assisting vehicle has completely passed the immediate intersection, as illustrated in region D in FIG. 4. The remaining drive assisting information is dynamic, and thus has a possibility of changing with the reception of the new intersection information of the immediate intersection. Thus, when the new intersection information is received, the drive assisting device 22 recalculates the remaining drive assisting information, and updates the information stored in the storage device 23. The drive assisting device 22 performs the drive assisting control associated with the immediate intersection based on the static essential drive assisting information, and performs the drive assisting control associated with the immediate intersection based on the remaining drive assisting information. Furthermore, if the simple drive assisting information associated with the successive intersection ahead of the immediate intersection is also calculated, the drive assisting device 22 performs the drive assisting control (e.g., vehicle speed control in the Green Wave Drive Assisting, etc.) associated with the immediate intersection based on the static essential drive assisting information associated with the immediate intersection, the remaining drive assisting information associated with the immediate intersection, and the simple drive assisting information associated with the successive intersection.

The simple drive assisting information completed with the calculation processing is stored in a first storage region of the storage device 23, and held until the calculation processing of the drive assisting information (static essential drive assisting information, dynamic essential drive assisting information, and unique drive assisting information) associated with the successive intersection is finished, as illustrated in regions D to G in FIG. 4. The drive assisting device 22 can perform the drive assisting control associated with the successive intersection based on the simple drive assisting information until the calculation processing is finished. Thus, the drive assisting control associated with the successive intersection based on the simple drive assisting information may be executed even after the assisting vehicle has passed the immediate intersection.

Therefore, in the drive assisting control associated with the immediate intersection, the drive assisting system 1 sequentially performs the calculation processing of the drive assisting information by dividing to the type of drive assisting information (dividing to the static essential drive assisting information and the dynamic essential drive assisting information, and the unique drive assisting information). Therefore, the drive assisting system 1 can reduce the load of the calculation processing.

Furthermore, the drive assisting system 1 starts the calculation processing of the simple drive assisting information of small load associated with the successive intersection with respect to the immediate intersection without waiting for the calculation processing of the drive assisting information (static essential drive assisting information, dynamic essential drive assisting information, and unique drive assisting information) associated with the immediate intersection. Therefore, the drive assisting system 1 can enhance the responsiveness of the drive assisting control associated with the successive intersection while suppressing the increase in the load of the calculation processing in the drive assisting control at the successive intersection.

Figure 3:
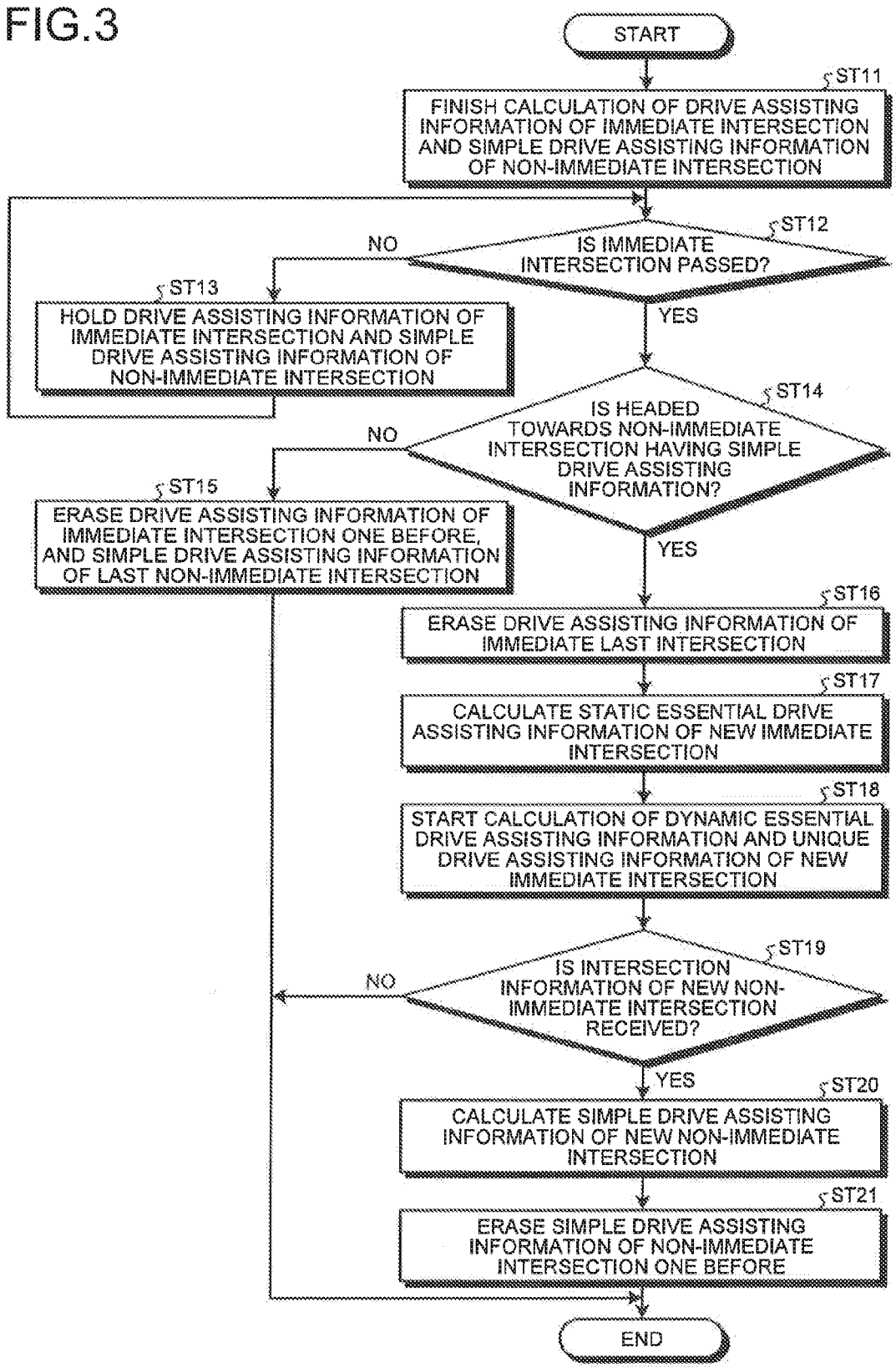
FIG. 3 is a flowchart explaining a calculation processing operation of an embodiment of the drive assisting system according to the present invention.

The flowchart of FIG. 3 describes the calculation processing associated with the drive assisting information after the assisting vehicle has passed the immediate intersection.

After finishing the calculation processing of the drive assisting information (static essential drive assisting information, dynamic essential drive assisting information, and unique drive assisting information) associated with the immediate intersection and the calculation processing of the simple drive assisting information associated with the successive intersection (step ST11), the drive assisting device 22 determines whether or not the own vehicle has passed the immediate intersection (step ST12). This determination can be executed based on the own vehicle position information and the map information. The own vehicle position information may be the own vehicle position information grasped by a GPS (Global Positioning System) control device 41 if the car navigation system is mounted on the own vehicle. The map information may be map information 42 of the car navigation system.

If the own vehicle has not passed the immediate intersection, the drive assisting device 22 returns to step ST12 while holding the drive assisting information associated with the immediate intersection and the simple drive assisting information associated with the successive intersection of after the calculation processing are finished in the storage device 23 (step ST13). The drive assisting device 22 in this case continues the drive assisting control associated with the immediate intersection based on the drive assisting information and the drive assisting control associated with the successive intersection based on the simple drive assisting information.

If the own vehicle has passed the immediate intersection, the drive assisting device 22 determines whether or not the exit way is a road heading toward the successive intersection (second intersection), which the simple drive assisting information is calculated (step ST14). In this case, the successive intersection (second intersection) becomes the new immediate intersection.

If not heading toward the successive intersection having the simple drive assisting information, the drive assisting device 22 erases the drive assisting information (static essential drive assisting information, dynamic essential drive assisting information, and unique drive assisting information) associated with the immediate intersection one before and the simple drive assisting information associated with the successive intersection one before with respect to the relevant immediate intersection from the storage device 23 (step ST15). The calculation processing is then terminated. However, if the drive assisting control with respect to the single intersection is continued, the calculation processing of the drive assisting information according to type may be executed with respect to the new immediate intersection. For example, if the guiding path is researched and the drive assisting control with respect to the successive intersection is also continued, the calculation processing of the drive assisting information associated with the immediate intersection and the calculation processing of the simple drive assisting information associated with the successive intersection are to be continued with respect to the new immediate intersection and the new successive intersection.

If heading towards the successive intersection having the simple drive assisting information, the drive assisting device 22 erases the drive assisting information (static essential drive assisting information, dynamic essential drive assisting information, and unique drive assisting information) associated with the immediate intersection one before from the storage device 23, as illustrated in region E in FIG. 4 (step ST16).

The drive assisting device 22 calculates the static essential drive assisting information associated with the successive intersection (second intersection), which newly became the immediate intersection, as illustrated in region F in FIG. 4 (step ST17). The static essential drive assisting information completed with the calculation processing is stored in the storage device 23, and held until the assisting vehicle has completely passed the new immediate intersection (second intersection), as illustrated in regions G to I in FIG. 4. The drive assisting device 22 performs the drive assisting control associated with the new immediate intersection based on the static essential drive assisting information. In the drive assisting control associated with the new immediate intersection, if that which is not included in the static essential drive assisting information exists in the simple drive assisting information of the storage device 23, the drive assisting device 22 also executes the control based on such non-redundant simple drive assisting information.

After the calculation processing of the static essential drive assisting information associated with the immediate intersection is finished, the drive assisting device 22 starts the calculation processing of the remaining drive assisting information (dynamic essential drive assisting information and unique drive assisting information) associated with the immediate intersection, as illustrated in region G in FIG. 4 (step ST18), and determines whether or not the intersection information of a new successive intersection (third intersection) with respect to the immediate intersection is received (step ST19), similar to step ST4.

If the intersection information of the new successive intersection is received, the drive assisting device 22 performs the calculation processing of the simple drive assisting information associated with the new successive intersection with respect to the immediate intersection, as illustrated in region G in FIG. 4, without waiting for the calculation processing of the remaining drive assisting information associated with the new immediate intersection to finish (step ST20). After the calculation processing of the remaining drive assisting information associated with the new immediate intersection is finished, the drive assisting device 22 erases the simple drive assisting information associated with the immediate intersection (i.e., successive intersection one before) from the storage device 23, as illustrated in region H in FIG. 4 (step ST21). The drive assisting device 22 stores the simple drive assisting information associated with the new successive intersection in a second storage region of the storage device 23.

If the intersection information of the new successive intersection is not received, the drive assisting device 22 terminates the calculation processing.

The remaining drive assisting information associated with the new immediate intersection completed with the calculation processing is stored in the storage device 23, and held until the assisting vehicle has completely passed the immediate intersection, as illustrated in regions H and I in FIG. 4, and updated when the new intersection information is received. The drive assisting device 22 performs the drive assisting control associated with the new immediate intersection based on the remaining drive assisting information.

The simple drive assisting information associated with the new successive intersection completed with the calculation processing is stored in the second storage region of the storage device 23, and held until the calculation processing of the drive assisting information (static essential drive assisting information, dynamic essential drive assisting information, and unique drive assisting information) associated with the new successive intersection is finished, as illustrated in regions H to L in FIG. 4. The drive assisting device 22 can perform the drive assisting control associated with the new successive intersection based on the simple drive assisting information until the relevant calculation processing is finished.

The drive assisting device 22 repeats the calculation of various types of drive assisting information described above and the drive assisting control based thereon for each intersection until the drive assisting control is canceled. For example, in the illustration of FIG. 4, the drive assisting control is terminated at the third intersection. Thus, the drive assisting device 22 does not calculate the simple drive assisting information associated with an intersection (fourth intersection) ahead of the third intersection. After the assisting vehicle has passed the third intersection, the drive assisting device 22 erases the drive assisting information (static essential drive assisting information, dynamic essential drive assisting information, and unique drive assisting information) associated with the third intersection, and terminates the drive assisting control, as illustrated in region O in FIG. 4.

Figure 5:
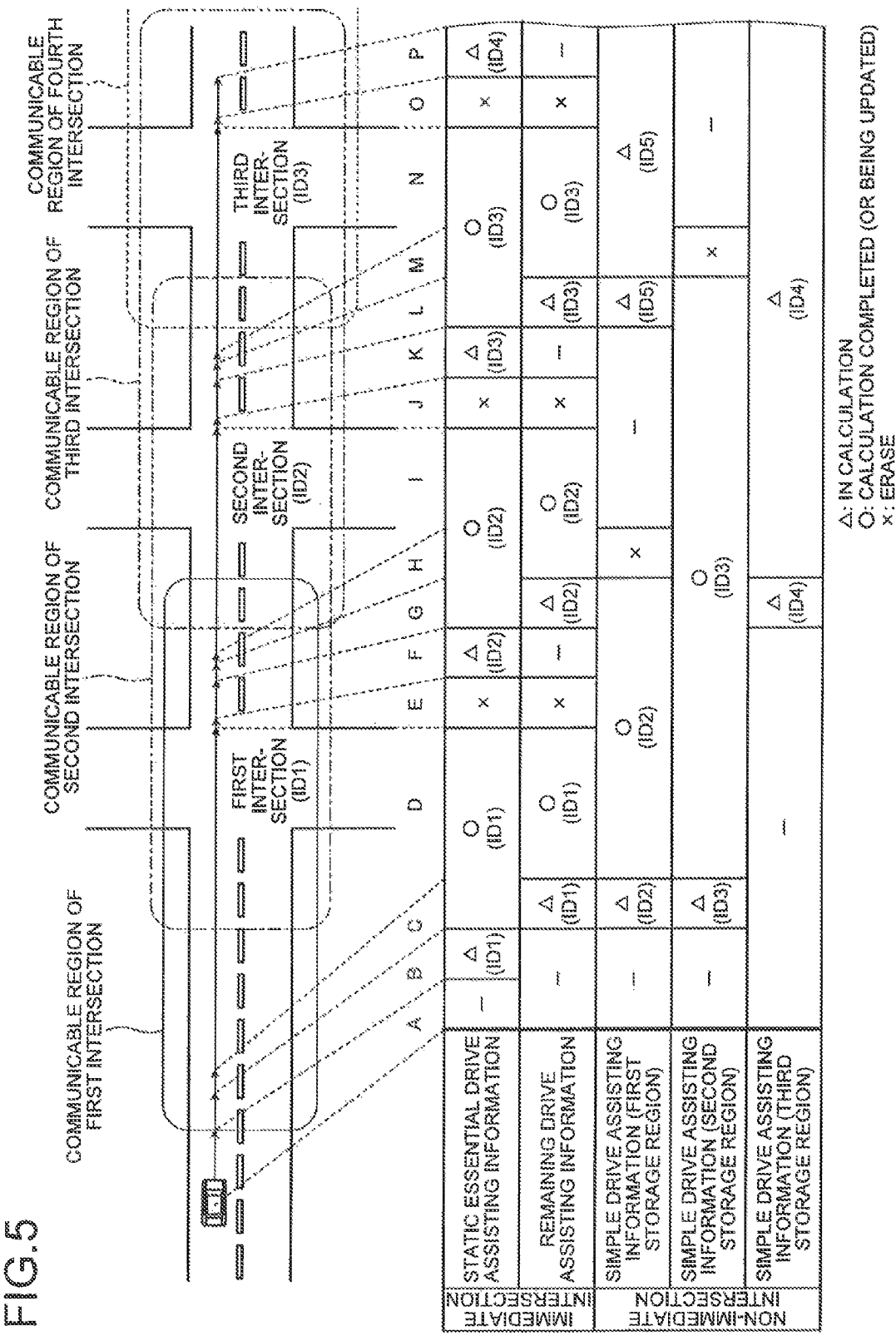
FIG. 5 is a view explaining the position with respect to the intersection of the assisting vehicle and the calculation timing of the drive assisting information.

In the illustration of FIG. 4, the arithmetic processing unit is assumed to have the processing ability capable of simultaneously calculating the drive assisting information associated with two intersections of the immediate intersection and the successive intersection. Thus, if the arithmetic processing unit has the processing ability capable of simultaneously calculating the drive assisting information associated with N intersections, the drive assisting system 1 can calculate the remaining drive assisting information (dynamic essential drive assisting information and unique drive assisting information) associated with the immediate intersection, and the simple drive assisting information associated with N−1 successive intersection at the same timing. The processing ability refers to that provided for the calculation processing of the drive assisting information among the entire processing ability of the arithmetic processing unit. In this case, if a plurality of successive intersections exists on the exit way from the immediate intersection of the assisting vehicle when the assisting vehicle has passed the immediate intersection, the successive intersection closest from the assisting vehicle is assumed as the new immediate intersection. For example, FIG. 5 illustrates the drive assisting system 1 capable of calculating the remaining drive assisting information associated with the immediate intersection and the simple drive assisting information associated with three successive intersections at the same timing. In the illustration of FIG. 5, the number of successive intersections that can be simultaneously processed is merely increased by one with respect to the illustration of FIG. 4, and the mode of the calculation processing of the drive assisting information is the same as the illustration of FIG. 4. Thus, the description of such calculation processing will be omitted here.

In the drive assisting system 1, the calculation processing of the static essential drive assisting information associated with the immediate intersection is finished prior to the simultaneous calculation of the remaining drive assisting information associated with the immediate intersection and the simple drive assisting information associated with N−1 successive intersections. Thus, the arithmetic processing unit of the drive assisting system 1 has room in the processing ability by the amount of the calculation processing of the static essential drive assisting information. Therefore, the drive assisting system 1 may execute the calculation processing of the simple drive assisting information associated with N successive intersections at the same timing as the calculation processing of the remaining drive assisting information associated with the immediate intersection.

As described above, the drive assisting system 1 can disperse the load of the calculation processing since the drive assisting information is divided according to type and sequentially calculated in the drive assisting control associated with the immediate intersection. The drive assisting system 1 performs the drive assisting control associated with the immediate intersection based on the drive assisting information calculated for every type. Thus, in the drive assisting system 1, the execution of the drive assisting control associated with the immediate intersection with reduced load can be performed. Furthermore, the drive assisting system 1 obtains the simple drive assisting information with suppressed amount of information compared to all detailed drive assisting information (static essential drive assisting information, dynamic essential drive assisting information and unique drive assisting information) necessary for the drive assisting control if before the assisting vehicle passes the immediate intersection in the drive assisting control associated with the successive intersection existing ahead of the immediate intersection, so that the simple drive assisting information can be calculated at the same timing as the remaining drive assisting information associated with the immediate intersection while suppressing the increase in the load of the calculation processing. The drive assisting system 1 can execute the drive assisting control based on the simple drive assisting information until all the detailed drive assisting information necessary for the drive assisting control associated with the successive intersection is calculated. Thus, in the drive assisting system 1, the execution of the drive assisting control associated with the successive intersection with reduced load can be performed. The drive assisting system 1 thus can reduce the load applied on the calculation processing of the drive assisting information even in the drive assisting control with respect to the single intersection and in the drive assisting control with respect to the plurality of intersections. Therefore, according to the drive assisting system 1, the drive assisting control can be inexpensively executed without using the arithmetic processing unit having high processing ability but is of high cost.

The processing ability of the arithmetic processing unit (i.e., calculation processing ability of the assisting vehicle) differs for every vehicle model, for example. Furthermore, the load may increase even in the same vehicle if, for example, the arithmetic processing unit is used for control other than the drive assisting control. Thus, the drive assisting system 1 may be configured to change the number N−1 of successive intersections to execute the calculation processing of the simple drive assisting information at the same timing according to the processing ability.

If the drive assisting control associated with the same intersection has been performed in the past, the past information can be used for at least the static drive assisting information when again executing the drive assisting control at the relevant intersection. Thus, after the execution of the drive assisting control associated with a certain intersection, the drive assisting device 22 can leave at least the static drive assisting information held in the storage device 23, and perform the drive assisting control using the past drive assisting information being held when again executing the drive assisting control at the relevant intersection and when before the drive assisting information associated with the relevant intersection is calculated. In this case, the drive assisting device 22 calculates the drive assisting information based on the most recent intersection information, and replaces such drive assisting information with the corresponding past drive assisting information. The intersection information associated with the past drive assisting information may be held in the storage device 23, in which case, comparison is made with the received most recent intersection information, and the drive assisting information is calculated based on the most recent intersection information if there is difference, and the past drive assisting information may be handled as the most recent drive assisting information without calculating the most recent drive assisting information if there is no difference. For example, the past drive assisting information can be used at the portion indicated with "−" in FIGS. 4 and 5. Thus, the most recent drive assisting information (in particular, static drive assisting information in which the possibility of changing is low) does not need to be calculated each time, in which case, further reduction in the load of the calculation processing can be achieved.

In the illustration made above, when performing the drive assisting control with respect to a plurality of intersections including the successive intersection ahead of the immediate intersection, the drive assisting information associated with such successive intersection can have the simple drive assisting information, which can reduce the load of the calculation processing, calculated based on the intersection information of the relevant successive intersection with respect to the drive assisting information associated with the immediate intersection. However, the illustrated technique may be applied not only for the successive intersection ahead of the immediate intersection, but also on the calculation of the drive assisting information associated with the intersection other than the immediate intersection (non-immediate intersection). That is, when performing the drive assisting control with respect to a plurality of intersections including the immediate intersection, the drive assisting information associated with the non-immediate intersection excluding the immediate intersection among the plurality of intersections may have the simple drive assisting information calculated based on the intersection information of the non-immediate intersection with respect to the drive assisting information associated with the immediate intersection. In this regard, the simple drive assisting information has the amount of information suppressed compared to the drive assisting information required for the drive assisting control associated with the non-immediate intersection, and is required for the drive assisting control associated with the non-immediate intersection at the stage before passing the immediate intersection. The simple drive assisting information has the amount of information suppressed compared to the drive assisting information required for the drive assisting control associated with the non-immediate intersection, and may be obtained by calculating the static information at the non-immediate intersection. The number of non-immediate intersections in which the calculation processing of the simple drive assisting information is executed at the same timing may be changed according to the calculation processing ability of the assisting vehicle. When performing the drive assisting control with respect to the plurality of intersections including the immediate intersection, the drive assisting control associated with the immediate intersection is executed based on the drive assisting information associated with the immediate intersection and the simple drive assisting information associated with the non-immediate intersection. Furthermore, in this case, if the assisting vehicle has passed the immediate intersection, the drive assisting control associated with the non-immediate intersection is executed based on the simple drive assisting information.

REFERENCE SIGNS LIST 1 drive assisting system
10 road side instrument
11 storage device
12 information collecting device
13 road side communicating device
20 in-vehicle device
21 vehicle side communicating device
22 drive assisting device
23 storage device
30 assisting instrument

The invention claimed is:

1. An in-vehicle drive assisting system, wherein the drive assisting system calculates drive assisting information associated with an intersection required for drive assisting control to an assisting vehicle based on intersection information of the intersection, and calculates the drive assisting information when performing the drive assisting control associated with the intersection based on the drive assisting information, the drive assisting information being divided to essential drive assisting information required for execution of the drive assisting control regardless of assisting content of the drive assisting control, and unique drive assisting information required for execution of the drive assisting control corresponding to the assisting content of the drive assisting control requested for execution.

2. The in-vehicle drive assisting system according to claim 1, wherein the essential drive assisting information is divided into static essential drive assisting information and dynamic essential drive assisting information and sequentially calculated.

3. The in-vehicle drive assisting system according to claim 2, wherein
the essential drive assisting information is divided to the static essential drive assisting information based on static information at the intersection and the dynamic essential drive assisting information that is remaining essential drive assisting information excluding the static essential drive assisting information, and
calculation of the drive assisting information is performed separately between the static essential drive assisting information, and the dynamic essential drive assisting information and the unique drive assisting information.

4. The in-vehicle drive assisting system according to claim 2, wherein
the intersection is an immediate intersection in an advancing direction of a road on which the assisting vehicle is traveling.

5. The in-vehicle drive assisting system according to claim 1, wherein the essential drive assisting information is divided to static essential drive assisting information based on static information at the intersection and dynamic essential drive assisting information that is remaining essential drive assisting information excluding the static essential drive assisting information, and
calculation of the drive assisting information is performed separately between the static essential drive assisting information, and the dynamic essential drive assisting information and the unique drive assisting information.

6. The in-vehicle drive assisting system according to claim 5, wherein
the intersection is an immediate intersection in an advancing direction of a road on which the assisting vehicle is traveling.

7. The in-vehicle drive assisting system according to claim 1, wherein the intersection is an immediate intersection in an advancing direction of a road on which the assisting vehicle is traveling.

8. The in-vehicle drive assisting system according to claim 7, wherein
when performing the drive assisting control to a plurality of intersections including the immediate intersection, drive assisting information associated with a non-immediate intersection excluding the immediate intersection among the plurality of intersections has simple drive assisting information calculated based on intersection information of the non-immediate intersection with respect to the drive assisting information associated with the immediate intersection.

9. The in-vehicle drive assisting system according to claim 8, wherein
the simple drive assisting information has an amount of information suppressed compared to the drive assisting information required for the drive assisting control associated with the non-immediate intersection, and information required for the drive assisting control associated with the non-immediate intersection is calculated at a stage before passing the immediate intersection.

10. The in-vehicle drive assisting system according to claim 9, wherein
the drive assisting control associated with the immediate intersection is executed based on the drive assisting information associated with the immediate intersection and the simple drive assisting information associated with the non-immediate intersection.

11. The in-vehicle drive assisting system according to claim 9, wherein
when the assisting vehicle has passed the immediate intersection, the drive assisting control associated with the non-immediate intersection is executed based on the simple drive assisting information.

12. The in-vehicle drive assisting system according to claim 9, wherein
when the assisting vehicle has passed the immediate intersection, a non-immediate intersection closest from the assisting vehicle in an exit way from the immediate intersection is assumed as a new immediate intersection.

13. The in-vehicle drive assisting system according to claim 8, wherein
the simple drive assisting information has an amount of information suppressed compared to the drive assisting information required for the drive assisting control associated with the non-immediate intersection, and static information is calculated at the non-immediate intersection.

14. The in-vehicle drive assisting system according to claim 13, wherein
the drive assisting control associated with the immediate intersection is executed based on the drive assisting information associated with the immediate intersection and the simple drive assisting information associated with the non-immediate intersection.

15. The in-vehicle drive assisting system according to claim 13, wherein
when the assisting vehicle has passed the immediate intersection, the drive assisting control associated with the non-immediate intersection is executed based on the simple drive assisting information.

16. The in-vehicle drive assisting system according to claim 8, wherein
the drive assisting control associated with the immediate intersection is executed based on the drive assisting information associated with the immediate intersection and the simple drive assisting information associated with the non-immediate intersection.

17. The in-vehicle drive assisting system according to claim 16, wherein
when the assisting vehicle has passed the immediate intersection, the drive assisting control associated with the non-immediate intersection is executed based on the simple drive assisting information.

18. The in-vehicle drive assisting system according to claim 8, wherein when the assisting vehicle has passed the immediate intersection, the drive assisting control associated with the non-immediate intersection is executed based on the simple drive assisting information.

19. The in-vehicle drive assisting system according to claim 8, wherein when the assisting vehicle has passed the immediate intersection, a non-immediate intersection closest from the assisting vehicle in an exit way from the immediate intersection is assumed as a new immediate intersection.

20. The in-vehicle drive assisting system according to claim 8, wherein number of non-immediate intersections in which calculation processing of the simple drive assisting information is executed concurrently is changed according to a calculation processing ability of the in-vehicle drive assisting system.

* * * * *